United States Patent [19]

Röhm

[11] Patent Number: 5,145,193
[45] Date of Patent: Sep. 8, 1992

[54] LOCKABLE DRILL CHUCK

[76] Inventor: Günter H. Röhm, Heinrich-Röhm-Strasse 50, D-7927 Sontheim, Fed. Rep. of Germany

[21] Appl. No.: 733,228
[22] Filed: Jul. 22, 1991

[30] Foreign Application Priority Data

Jul. 21, 1990 [DE] Fed. Rep. of Germany ....... 4023303

[51] Int. Cl.⁵ .......................................... B23B 31/12
[52] U.S. Cl. ................................... 279/62; 279/140; 279/902
[58] Field of Search .............. 279/1 K, 1 ME, 60–65, 279/140, 902

[56] References Cited

U.S. PATENT DOCUMENTS

| 3,807,745 | 4/1974 | Bent | 279/60 |
| 4,213,622 | 7/1980 | Röhm | 279/1 K |
| 4,214,765 | 7/1980 | Röhm | 279/1 K |
| 4,840,387 | 6/1989 | McCarthy | 279/1 K |
| 4,955,623 | 9/1990 | Röhm | 279/63 X |
| 5,009,439 | 4/1991 | Sakimaki | 279/147 X |
| 5,044,643 | 9/1991 | Nakamura | 279/60 |

FOREIGN PATENT DOCUMENTS 3406668  4/1987  Fed. Rep. of Germany.

Primary Examiner—Steven C. Bishop
Attorney, Agent, or Firm—Herbert Dubno; Andrew Wilford

[57] ABSTRACT

A drill chuck has a chuck body centered on and adapted to be rotated about a longitudinal axis and formed with a plurality of forwardly open angled guides angularly spaced about the axis, respective jaws displaceable along the guides in the chuck body and each formed with a row of teeth, and a tightening collar rotatably surrounding the body, formed internally with a screwthread meshing with the teeth of the jaws, and forming with the chuck body an annular space axially forward of the screwthread so that rotation of the collar in one direction moves the jaws radially together and opposite rotation moves them radially apart. A locking element axially displaceable in the space and nonrotatable on the chuck body is biased backward into axial engagement with the tightening collar to brake rotation of same. This locking element is a ring coaxial with the chuck body and interengaging formations on the ring and on the chuck body rotationally couple same together while permitting same to move axially relative to each other. At least one spring is braced axially between the ring and the body.

16 Claims, 3 Drawing Sheets

LOCKABLE DRILL CHUCK

FIELD OF THE INVENTION

The present invention relates to a drill chuck. More particularly this invention concerns such a chuck which can be locked once it is tightened on a tool.

BACKGROUND OF THE INVENTION

A standard hammer-drill chuck that is rotated about an axis of a drill spindle to rotate a drill bit about and reciprocate it along the axis has a chuck body securable to the spindle and formed centered on the axis with a screwthread. A collar rotatable but axially nondisplaceable on the chuck body is formed angularly equispaced about the axis with a plurality of angled jaw guides, although it is possible to form the guides on the chuck body and the screwthread on the collar for the same effect. Respective jaws in the guides have racks that mesh with the screwthread so that rotation of the collar on the chuck body about the axis in a tightening direction moves the jaws radially together and opposite rotation in a loosening direction moves the jaws radially apart. As described in U.S. Pat. No. 4,955,623, issued Sep. 11, 1990 a locking ring is provided that is limitedly angularly displaceable relative to the chuck body but nonrotatable thereon. In addition this ring is formed with teeth or other formations that mesh axially with complementary formations on the collar and the ring is axially displaceable on the chuck body between a back unlocked position with the formations disengaged and relative rotation of the ring and collar possible, and a front position with the formations in mesh and such relative rotation impossible. The function of this ring is to prevent accidental opening of the chuck.

As described in German patent document 3,406,668 the locking ring is axially behind the tightening ring, that is it must be pulled axially back to unlock the chuck. This is only possible when there is sufficient space at the back of the chuck. Thus this type of arrangement is not compact.

OBJECTS OF THE INVENTION

It is therefore an object of the present invention to provide an improved drill chuck.

Another object is the provision of such an improved drill chuck which overcomes the above-given disadvantages, that is which can be locked yet which is still of axially reduced dimensions.

SUMMARY OF THE INVENTION

A drill chuck according to the instant invention has a chuck body centered on and adapted to be rotated about a longitudinal axis and formed with a plurality of forwardly open angled guides angularly spaced about the axis, respective jaws displaceable along the guides in the chuck body and each formed with a row of teeth, and a tightening collar rotatably surrounding the body, formed internally with a screwthread meshing with the teeth of the jaws, and forming with the chuck body an annular space axially forward of the screwthread so that rotation of the collar in one direction moves the jaws radially together and opposite rotation moves them radially apart. According to the invention a locking element axially displaceable in the space and nonrotatable on the chuck body is biased backward into axial engagement with the tightening collar to brake rotation of same. This locking element is a ring coaxial with the chuck body and interengaging formations on the ring and on the chuck body rotationally couple same together while permitting same to move axially relative to each other. At least one spring is braced axially between the ring and the body.

Thus with this arrangement the locking ring is moved forward on the chuck, that is away from the power unit and toward the tool to unlock the chuck and allow it to be tightened or loosened. Thus the chuck can be mounted tight to the power unit, and will still leave plenty of room for the locking ring to be pushed out and release it.

According to the invention the locking ring and the tightening collar have axially confronting, complementary, and engageable surfaces that are pressed together by the spring. These confronting surfaces are frustoconical and centered on the axis. Furthermore they are formed with interfitting axial projections and recesses constituted as complementary axially projecting and interengaging sets of teeth. These teeth in turn have angled flanks so that when the collar is forcibly rotated on the body the flanks can the ring axially forward and the teeth slip angularly past each other.

The locking ring according to this invention can be formed with a radially outwardly open groove centered on a plane perpendicular to the axis and the collar is formed with a throughgoing slot having at least one edge extending at an acute angle to the plane and overlapping the groove. In this case the chuck further has an unlocking pin angularly displaceable in the slot and engaged in the groove so that angular displacement of the pin in the slot cams the ring axially forward and disengages the surfaces from each other. The pin can be retained in the end of the slot by forming it with an axially forwardly open recess in which the pin is seatable. The slot has axially front and rear edges, the latter being angled relative to the groove and the front edge lying generally parallel to the plane. The collar itself is formed by a tightening ring formed with the screwthread and a tightening sleeve surrounding and rotationally fixed to the tightening ring, the slot is formed in the sleeve. The tightening ring and tightening sleeve are formed with axially extending interengaging ridge and groove formations that rotationally couple them together and that permit them to move axially relative to each other.

According to another feature of the invention the ring is formed with a plurality of axially open seats and respective axially extending compression springs in the seats are braced against the body.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
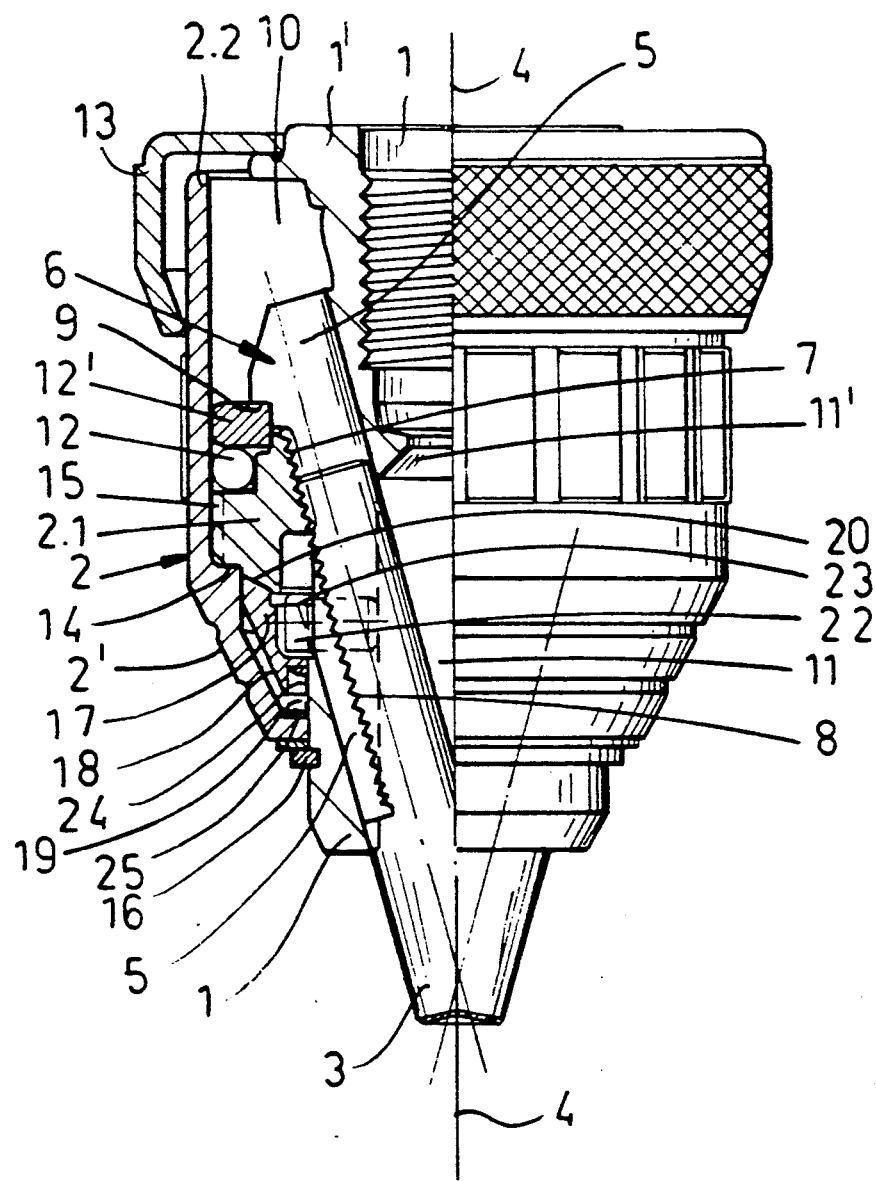
FIG. 1 is a side view partly in axial section through a chuck according to the invention

As seen in FIG. 1 a chuck according to the invention has a one-piece steel chuck body 1 centered on and rotatable about an axis 4 and having an axially rearwardly open bore 1' adapted to receive the spindle of a drill for rotation of this body 1 about the axis 4. The body 1 is also formed with a forwardly open bore 11 and with a passage 11' axially interconnecting the coxial bores 1' and 11 and permitting a hammer rod the drill spindle to act directly on the rear end of a tool projecting axially forward from the bore 11. In addition the body 1 is formed with three angularly equispaced guide passages 5 each receiving a respective jaw 3 and each opening at its rear end at 6 along the side of the body 1. The guides 5 are identically inclined to the axis 4 and are angularly equispaced about it, lying on a forwardly tapering frustocone centered on the axis 4.

An adjustment collar 2 coaxially surrounds the body 1 to define with it an annular space 10 at the openings 6 an is axially fixed against displacement thereon. This collar 2 is formed by an outer sleeve 2.2 which covers the openings 6 and a steel inner ring 2.1 which is formed with an internal frustoconical screwthread 7 that meshes with teeth 8 formed on the radial outer edges of the jaws 3. The ring 2.1 bears axially forward on a shoulder 14 formed on the sleeve 2.2 and has an axially backwardly directed annular surface on which ride balls 12 that in turn bear axially backward on a bearing ring 12' that itself bears axially backward on a shoulder 9 formed on the body 1. Interengaging ridges and grooves 15 on the sleeve 2.2 and ring 2.1 rotationally couple these two parts together while permitting them to move axially relative to each other so that the ring 2.1 can be inserted into the sleeve 2.2 from the back. A knurled sleeve 13 is force-fitted over the rear end of the sleeve 2.2 to make it easy to grip and rotate the collar 2 manually.

A spring snap ring 16 is received in a radially outwardly open groove formed in the front end of the chuck body 1 and the front end of the sleeve 2.2 bears forward via a washer against this ring 16. Thus forward displacement of the collar 2 formed by the parts 2.1 and 2.2 is inhibited by the ring 16 secured in the body 1 and backward displacement by the bearing 12 and ring 12' bearing against the shoulder 9 of the body 1.

A locking ring 17 is held in a space 18 formed forward of the ring 2.1 between the sleeve 2.2 and the body 1 and has a rearwardly directed frustoconical surface 20 bearing on a complementary surface of the ring 2.1. This ring 17 is formed with a plurality of axially forwardly open pockets 24 in which are seated the rear ends of coil-type compression springs 19 bearing axially forward at their forward ends on a rearwardly directed surface 25 of the sleeve 2.2 to push the ring 17 upward against the ring 2.1. In addition a bolt 23 anchored in and projecting radially from the body 1 into an axially rearwardly open pocket 22 of the ring 17 rotationally couples this ring 17 to the body 1 while still permitting it to move axially thereon.

In the arrangement of FIG. 1, therefore, the ring 17 which is continuously pressed by the springs 19 axially back against the ring 2.1 rotationally brakes same.

Figure 2:
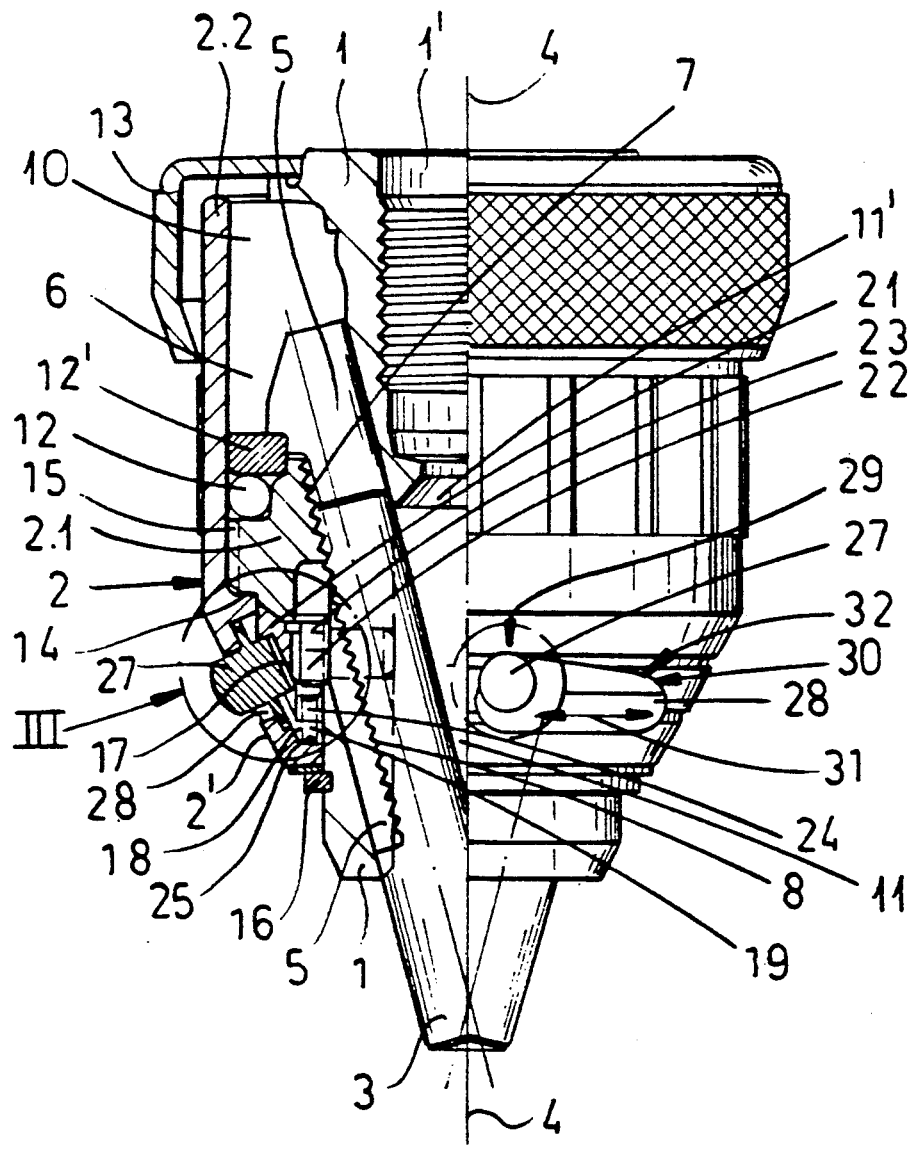
FIG. 2 is a view like FIG. 1 of another chuck in accordance with this invention.
Figure 3:
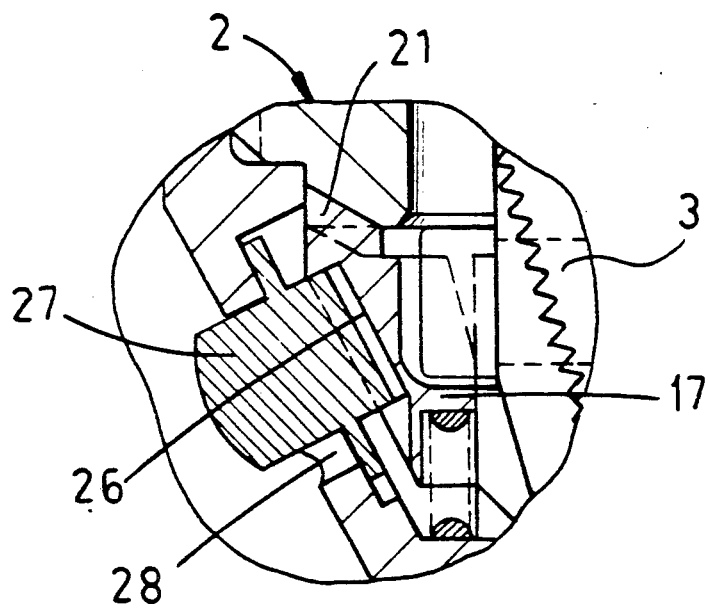
FIG. 3 is a large-scale view of the detail indicated at III in FIG. 2.
Figure 4:
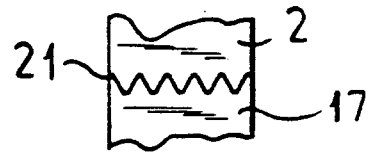
FIG. 4 is a large-scale view of another detail of this invention.

FIGS. 2 through 4 show an arrangement wherein the rings 17 and 2.1 are formed with interengaging teeth 21 having angled flanks as seen in FIG. 4. It is possible to adjust such a chuck, that is rotate its collar 2 relative to its chuck body 1, simply by forcing the collar 2 to rotate on the body 1 manually. This action causes the teeth 21 to cam the ring 17 axially downward against the force of the springs 8, thereby allowing the parts to be adjusted. The spring force is sufficient to prevent the chuck from loosening spontaneously, but not enough to prevent a user from adjusting it.

It is also possible as further shown in FIGS. 2 and 3 for the ring 17 to be formed on its frustoconical front surface with an outwardly open groove 26 in which engages at least one button or pin 27 that rides in a slot 28 formed in the sleeve 2.2. This slot 28 in turn has a rear edge that is inclined to a plane perpendicular to the axis 4 and a front edge that is parallel to this plane to give it a basically triangular shape with a wide rear end 29 and a narrow front end 30. As the button or buttons 27 are moved from the end 29 to the end 30 as indicated by arrow 31 they pull the ring 17 axially forward to disengage the teeth 21 from each other, thereby decoupling the rings 17 and 2.2 and freeing the ring 2.2 for rotation in either direction on the body 1. The locking end 30 is formed at the rear edge with a forwardly open cutout or seat 32 into which the pin 27 can fit to hold the pin 27 in this position.

Thus with the arrangement of FIGS. 2 and 3 to unlock the clutch the pin or pins 27 are pushed angularly to the end 30 where they seat in the recesses 32, and the chuck can be adjusted in the standard manner by gripping the sleeve 13 and turning the collar 2. Once the tool is set, the buttons 27 are shifted angularly back to the ends 29 of the slots 28, and the chuck is again latched.

I claim:

1. A drill chuck comprising:
   a chuck body centered on an adapted to be rotated about a longitudinal axis and formed with a plurality of forwardly open angled guides angularly spaced abut the axis;
   respective jaws displaceable generally axially along the guides in the chuck body and each formed with a row of teeth;
   a tightening collar rotatably surrounding the body, formed internally with a screwthread meshing with the teeth of the jaws and axially substantially nondisplaceable on the body, and forming with the chuck body an annular space axially forward of the screwthread, whereby rotation of the collar in one direction moves the jaws radially together and opposite rotation moves them radially apart;
   a locking element axially displaceable in the space and nonrotatable on the chuck body; and
   spring means for urging the element into axial engagement with the tightening collar and thereby braking rotation of same.

2. The drill chuck defined in claim 1 wherein the locking element is a ring coaxial with the chuck body, the chuck further comprising
   interengaging formations on the ring and on the chuck body for rotationally coupling same together while permitting same to move axially relative to each other, the spring means including at least one spring braced axially between the ring and the body.

3. The drill chuck defined in claim 1 wherein the element is formed with a plurality of axially open seats and the spring means includes respective axially extending compression springs in the seats braced against the body.

4. The drill chuck defined in claim 1 wherein the collar has an axially forwardly tapered front end.

5. A drill chuck comprising:
- a chuck body centered on an adapted to be rotated about a longitudinal axis and formed with a plurality of forwardly open angled guides angularly spaced abut the axis;
- respective jaws displaceable along the guides in the chuck body and each formed with a row of teeth;
- a tightening collar rotatably surrounding the body, formed internally with a screwthread meshing with the teeth of the jaws, and forming with the chuck body an annular space axially forward of the screwthread, whereby rotation of the collar in one direction moves the jaws radially together and opposite rotation moves them radially apart;
- a locking ring coaxial with the chuck body, axially displaceable in the space and nonrotatable on the chuck body;
- spring means including at least one spring bracket axially between the ring and the body for urging the ring into axial engagement with the tightening collar and thereby braking rotation of same; and
- interengaging formations on the ring and on the chuck body for rotationally coupling same together while permitting same to move axially relative to each other.

6. The drill chuck defined in claim 5 wherein the locking ring and the tightening collar have axially confronting, complementary, and engageably surfaces that are pressed together by the spring.

7. The drill chuck defined in claim 6 wherein the confronting surfaces are frustoconical and centered on the axis.

8. The drill chuck defined in claim 6 wherein the faces are formed with interfitting axial projections and recesses.

9. The drill chuck defined in claim 8 wherein the projections and recesses are formed by complementary axially projecting and interengaging sets of teeth.

10. The drill chuck defined in claim 9 wherein the teeth have angled flanks, whereby when the collar is forcibly rotated on the body the flanks cam the ring axially forward and the teeth slip angularly past each other.

11. The drill chuck defined in claim 5 wherein the locking ring is formed with a radially outwardly open groove centered on a plane perpendicular to the axis and the collar is formed with a throughgoing slot having at least one edge extending at an acute angle to the plane and overlapping the groove, the chuck further comprising
- an unlocking pin angularly displaceable in the slot and engaged in the groove, whereby angular displacement of the pin in the slot cams the ring axially forward and disengages the surfaces from each other.

12. The drill chuck defined in claim 11, further comprising
means for retaining the pin in an end of the slot.

13. The drill chuck defined in claim 12 wherein the retaining means is an axially forwardly open recess in the slot in which the pin is seatable.

14. The drill chuck defined in claim 11 wherein the slot has axially front and rear edges, the rear edge being angled relative to the groove and forming the one edge and the front edge lying generally parallel to the plane.

15. The drill chuck defined in claim 11 wherein the collar is formed by a tightening ring formed with the screwthread and a tightening sleeve surrounding and rotationally fixed to the tightening ring, the slot being formed in the sleeve.

16. The drill chuck defined in claim 15 wherein the tightening ring and tightening sleeve are formed with axially extending interengaging ridge and groove formations that rotationally couple them together and that permit them to move axially relative to each other.

* * * * *